United States Patent [19]
Redcay

[11] 3,849,778
[45] Nov. 19, 1974

[54] PULSE DOPPLER FUSE

[75] Inventor: Paul Wilson Redcay, Washington, D.C.

[73] Assignee: The United States of America as Represented by the Secretary of the Army, Washington, D.C.

[22] Filed: Mar. 8, 1950

[21] Appl. No.: 148,444

[52] U.S. Cl............................ 343/7 PF, 102/70.2 P
[51] Int. Cl............................................. F42c 13/04
[58] Field of Search ...................... 102/70.2 P, 70.2; 250/20.26, 15 T; 343/7.7, 7, 7 PF

[56] References Cited
UNITED STATES PATENTS

| | | | |
|---|---|---|---|
| 2,230,108 | 1/1941 | Gerhard | 250/20.26 |
| 2,455,639 | 12/1948 | Anderson | 343/8 |
| 2,586,028 | 2/1952 | Grayson | 343/7.7 |
| 2,699,543 | 1/1955 | Naumann et al. | 343/7 PF |
| 3,732,564 | 5/1973 | Kuck et al. | 343/7 PF |

FOREIGN PATENTS OR APPLICATIONS

| | | | |
|---|---|---|---|
| 585,791 | 2/1947 | Great Britain | 343/7 |

Primary Examiner—T. H. Tubbesing
Attorney, Agent, or Firm—Nathan Edelberg; Saul Elbaum

EXEMPLARY CLAIM

2. An ordnance fuse comprising a pulsed radio frequency oscillator, pulsing means for said oscillator, said oscillator including an electron tube having grid, plate and cathode elements, a diode for detecting reflections of radio frequency energy generated by said oscillator and radiated by radiation means coupled thereto, said radiation means common to the oscillator and diode, a frequency selective amplifier coupled to said diode and responsive to the Doppler frequency due to the relative movement of said fuse and a reflective surface, detonator triggering means coupled to the output of said amplifier, and wind driven alternating current generating means for supplying power to the fuse, said pulsing means comprising a transformer coupled to the high voltage output of said generating means, rectifying means connected across the output terminals of said transformer, said grid connected to the transformer at a point intermediate its output terminals whereby a variable bias is applied to said grid and said oscillator periodically pulsed in accordance with the frequency of said generating means.

2 Claims, 5 Drawing Figures

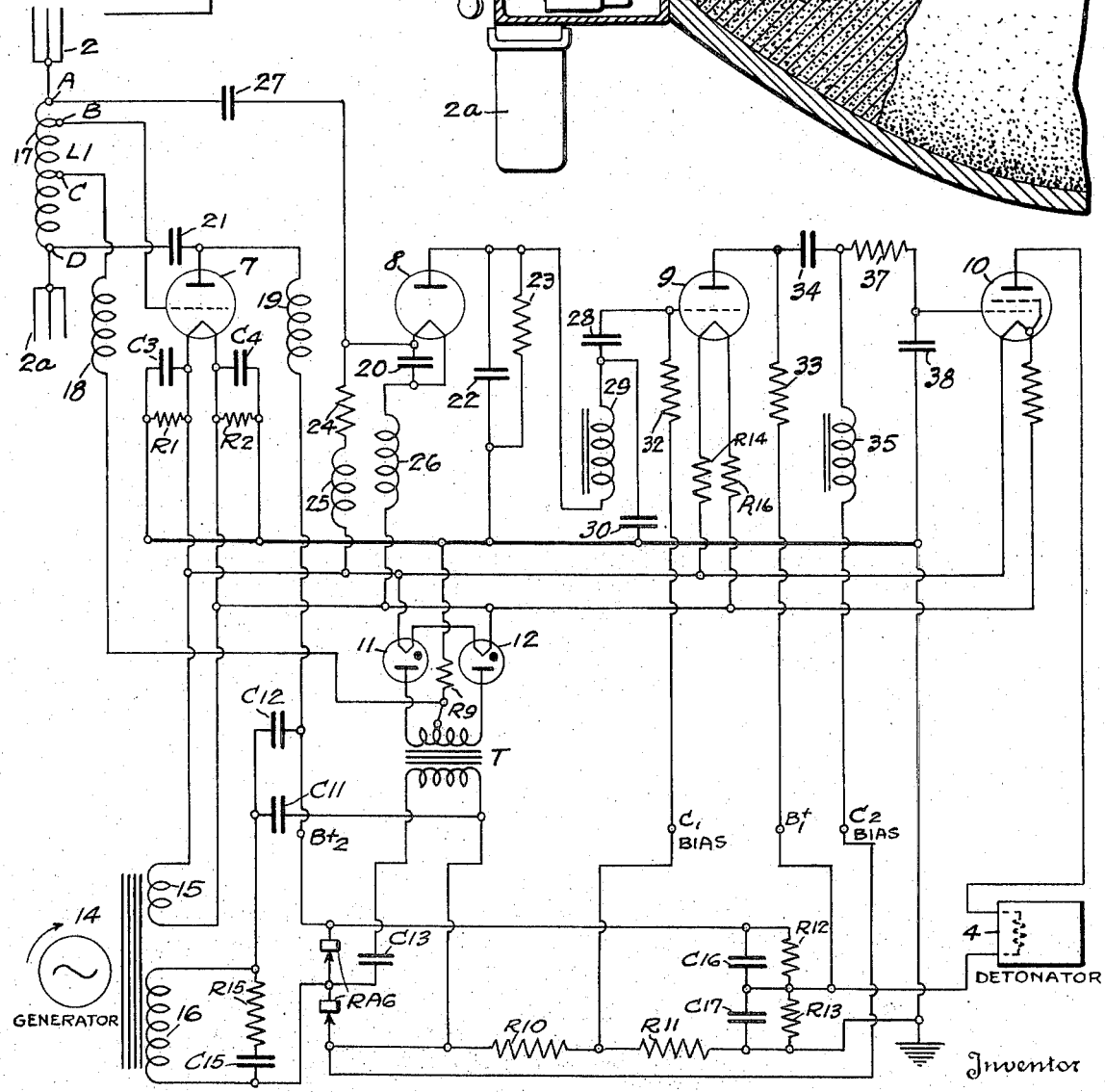

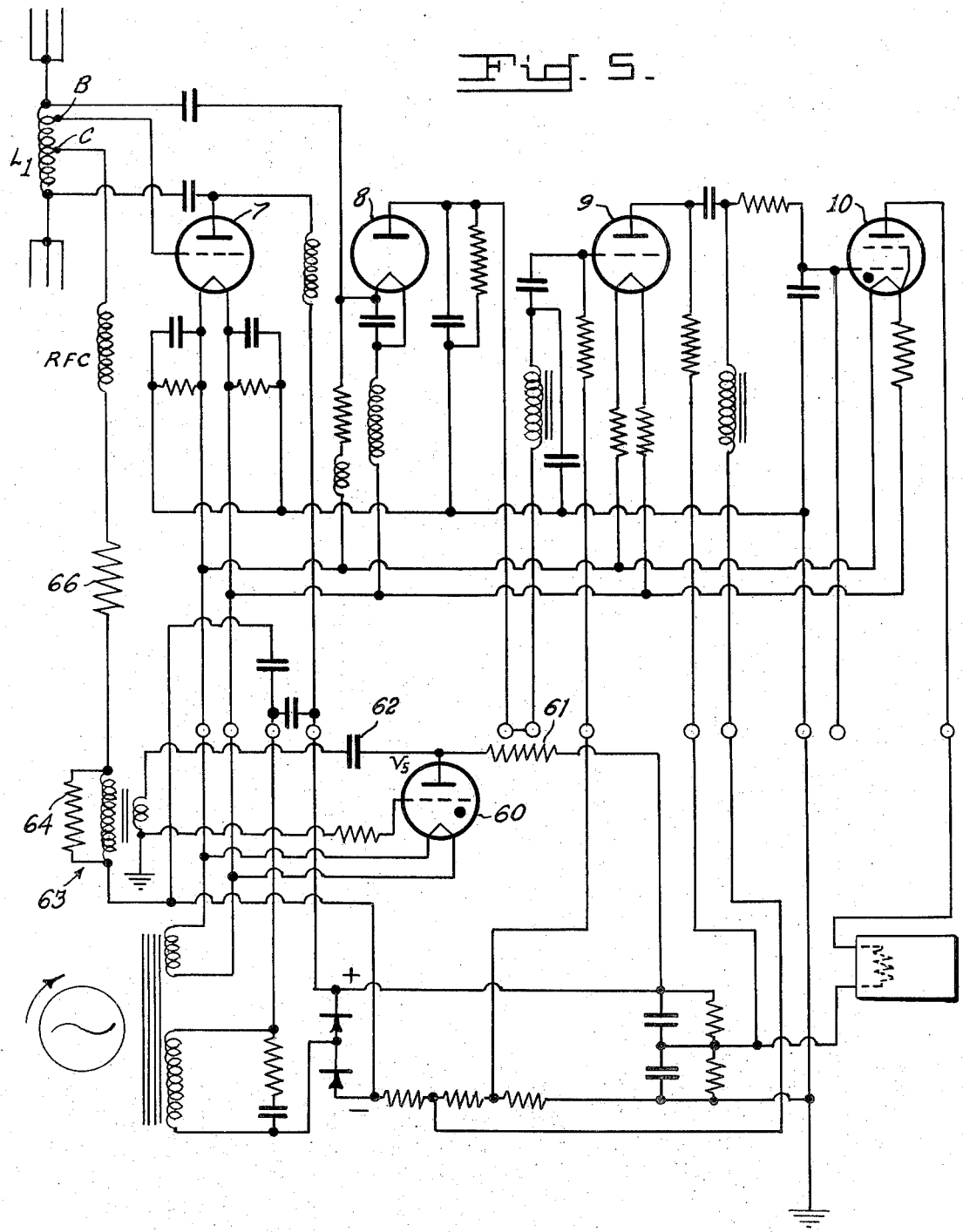

PULSE DOPPLER FUSE

This invention relates to an electronic proximity fuse and more specifically to a Doppler type fuse, that is, one operating on the interference frequency between transmitted waves and those returned from an object moving relatively to the fuse. A known fuse of this type operates upon a continuous transmitted wave.

It is a primary object of this invention to improve the operation of Doppler fuses by transmitting energy from the fuse in the form of very brief pulses of energy, each pulse being a burst of high frequency oscillating energy, and detecting indications of Doppler interference of the high frequency energy within each pulse due to the presence of a reflecting target.

An important advantage of this invention is that the power transmitted in each pulse of high frequency energy may be greatly increased, for comparable equipment, over that possible using a continuous high frequency output, thus greatly increasing the range and/or sensitivity of the fuse. Another advantage is that the difficulty of jamming is greatly increased since much greater jamming energy must be employed. The increase in sensitivity and power results from the fact that the same amount of energy concentrated into a pulse of brief duration permits the use of much higher maximum power without overloading the equipment and the sensitivity can be made a function of the peak power employed rather than of the average power.

The specific nature of the invention as well as other objects and advantages thereof will be more clearly apparent from the following description together with the accompanying drawings in which:

FIG. 1 is a schematic view of a projectile embodying the fuse of the invention;

FIG. 2 is an overall circuit diagram of the fuse;

FIG. 5 is a circuit diagram of the fuse wherein is illustrated a modification of the pulse forming means.

Figure 3:
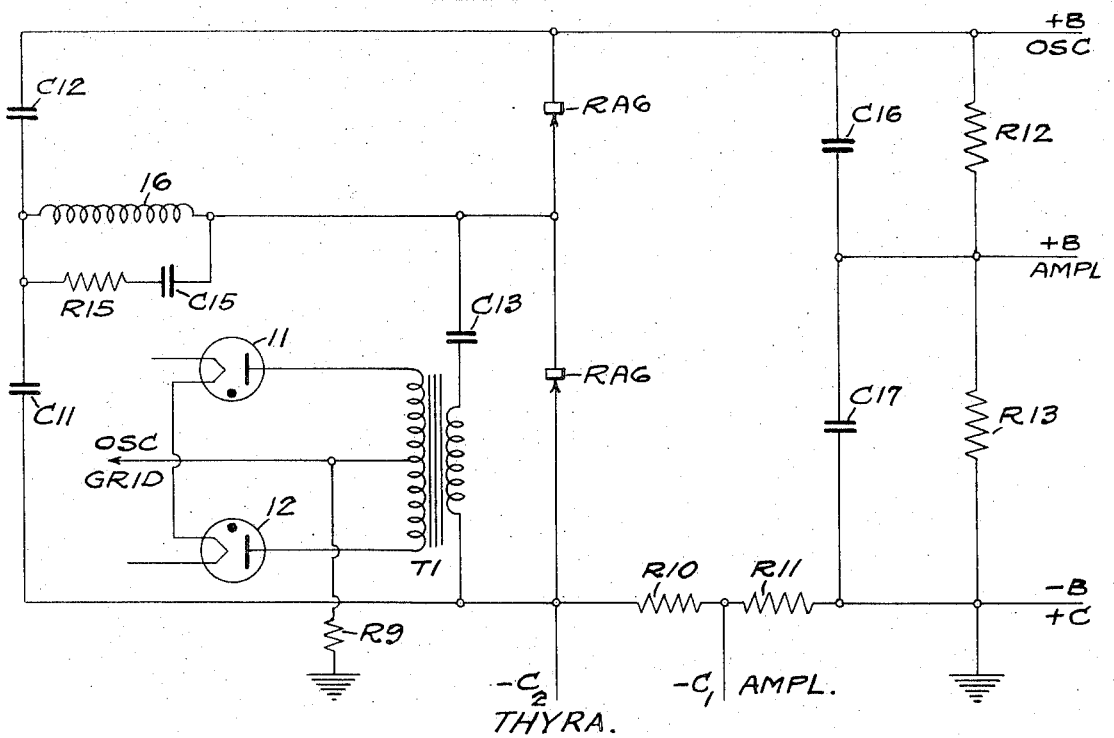
FIG. 3 is a circuit diagram of the voltage doubling and pulse forming network of FIG. 1 in simplified form.

Referring to FIG. 1, the projectile 1 is shown carrying antenna 2, 2a, on its nose, which is the transmitting and receiving antenna of the fuse. The antenna is connected to the electrical components of the fuse indicated as block 3, the details of which are shown below. The electrical circuit of the fuse is connected to detonator 4 which may be associated with a conventional booster indicated at 5 for initiating proper explosion of the projectile when an energy signal is received by the fuse. Windvane 6 drives generator 14 when the projectile is in flight to supply energy for the circuit.

Referring to FIG. 2, an antenna which may be a dipole, 2, 2a, as shown, is fed from a tank circuit L1, connected as in conventional oscillators. In the particular circuit used, 6 tubes are employed. These are 7 an oscillator, 8 a diode detector, 9 a class A audio amplifier, 10 a thyratron, and 11 and 12 a pair of half-wave rectifiers connected to provide full wave rectification. These tubes function as hereinafter described. A generator 14 consists of a wind-driven permanent magnet rotor, and two pick-up coils 15 and 16. Coil 15 provides raw AC to supply the filaments of all six tubes. Proper dropping resistors are employed to reduce the voltage where necessary. Coil 16 provides high voltage of a frequency determined by generator speed. This generator speed is regulated, by means covered in other applications, to provide a frequency of approximately a few thousand cycles per second. The output of coil 16 is fed into the voltage-doubling pulse-generating circuit which is described more fully in connection with FIG. 3. Referring now to oscillator 7, its plate is supplied with a relatively high voltage of the order of 400 volts. A raw full-wave rectified DC is fed to tap C of the tank coil 17 through which it is applied to the grid of tube 7. The effect of this application of raw DC to the grid is alternately to block the grid of 7, preventing oscillation, and to lower the bias on this grid, permitting oscillation, at the rate determined by the control of the generator speed producing AC as rectified in 11 and 12. A radio frequency choke, 18, is provided in this grid lead to prevent any radio frequencies from leaking to the rectifier circuit and thence to the balance of the fuse circuitry. An additional radio frequency choke 19, is provided in the plate feed circuit for a similar purpose. Tap D of the tank coil is connected to the plate through a blocking condenser 21. The signals generated at 7 and its associated circuitry are radiated into space from antennas 2, 2a. Filament resistors R1 and R2 and R14 and R16 are in the circuit to balance to ground any ripple appearing in the filament upsetting the performance at the control grid of tubes 7 and 9.

Tube 8 serves a dual function. It acts as a radio frequency filter in connection with elements 22, 23, 24, 25 and 26 to prevent these frequencies from being impressed upon the amplifier tube 9. Condenser 20 serves as an RF bypass for the filament of tube 8. Chokes 25 and 26 and associated resistor 24 act as dropping resistors for proper filament voltage and also serves as a high impedance element to the RF signals from tank 17. This combination also prevents any audio frequencies developed from the pulse forming network from entering tube 8. In addition to acting as an RF filter, tube 8 operates as a diode detector in the following manner: When the bomb or other vehicle carrying the fuse approaches the ground or other target, the signals emitted by antennas 2 and 2a strike such target and are reflected to the fuse. These reflected signals are in the shape of pulses and are combined with the transmitted pulses. As a result, an envelope is formed shaped to the peaks where Doppler effect occurred, as is described more fully below in connection with FIG. 4. These signals (i.e., the transmitted signal as combined with the reflected signal) are fed from point A of the tank coil through coupling condenser 27 to tube 8, which now functions as a diode detector. Conventional diode circuits will not perform satisfactorily because of high ripple associated with the pulse method employed in the oscillator and the shunting and loading effects of said conventional diode circuits. For this reason, we couple the diode input to the cathode of tube 8 rather than to the plate, because of the need to employ condenser 22 as an RF bypass and also to minimize ripple. A direct coupling to the plate would therefore be shunted by this condenser. To obviate this difficulty we feed the signal to the cathode as shown, thus enabling attainment of high efficiency operation which would be impossible if an RF choke were used in the plate output circuit of tube 8 to prevent condenser 22 from acting as an RF shunt. The output of tube 8 is fed to an AF resonant boost circuit 29, 30, designed to pass the desired Doppler frequency, and thence through coupling condenser 28 to the grid of tube 9, the class A audio amplifier. Resistor 32 serves as a grid bias resistor for this tube, while 33 serves as a plate supply resistor. Capacitor 34 together with choke 35 is a high-pass filter to take out frequencies below the desired Doppler frequency. Resistor 37 together with condenser 38 forms a low-pass filter to take out frequencies above the desired Doppler frequency if such have passed the filter 29, 30 previously mentioned. Capacitor 34 also serves as a coupling capacitor to impress the amplified Doppler frequency from the plate of tube 9 on the grid of thyratron 10. Thyratron 10 has its grid biased to a few volts below firing point of this tube. When a signal of adequate amplitude is received from tube 9, the firing point is passed and the thyratron fires, causing a flow of current to actuate the detonator shown.

Referring now to FIG. 3, the generator winding, 16, the output of which is controlled by the regulator circuit R15, C15, is connected to a conventional full wave voltage doubler circuit consisting of rectifiers RA6, and condensers C11, and C12. Condenser C13 is used to assure that only alternating current reaches the primary of transformer T1. Resistors R10, R11, R12 and R13, together with capacitors C16 and C17, provide the values of B and C voltages required for the operation of the circuitry previously described. The circuitry of the secondary of transformer T1 is that of a conventional full-wave rectifier, but since it is not filtered, it fluctuates from zero to maximum and it is this secondary voltage which is used to change the bias on the grid of tube 7 and thereby cause the generation of pulses, the frequency of which is, as has been said, governed by the rotational speed of the generator rotor and number of poles thereon.

Figure 4:
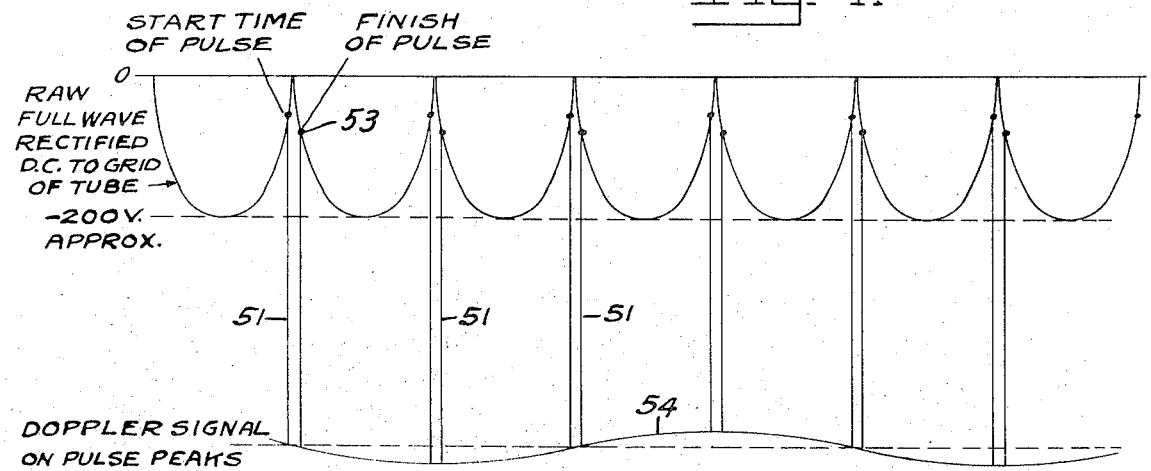
FIG. 4 is a wave form diagram showing the wave relationships in the various parts of the circuit of FIG. 2.

FIG. 4 which is relatively self-explanatory shows the wave relationships in the various parts of the circuit. The raw full wave rectified d.c. is fed from the full wave rectifier to point C of coil 17 and thence through point B to the grid of tube 7. As this voltage becomes less negative on approaching zero value a point is reached at which tube 7 begins to oscillate. These oscillations are indicated by pulse 51 which is in reality a train of high frequency oscillations. Tube 7 continues to oscillate until the grid voltage reaches the negative value indicated at point 53 in FIG. 4, at which the bias is too negative to permit further oscillations. The circuit remains in the non-oscillatory condition during the next pulse of rectified d.c. until it again reaches the value at which oscillation commences and the cycle is thereupon repeated as before. Due to the narrow width of the pulses (or rather, trains of oscillations) 51 compared with the interval between said pulses the circuit constants can be selected to provide a very high value of amplitude for these pulses without overloading the circuit. If a reflecting body is within the range of sensitivity of the fuse and if there is sufficient velocity of relative motion between the fuse and this reflecting body, the antenna will receive, during the time it is transmitting a given pulse, reflected high frequency waves of slightly different frequency from the transmitted waves, due to the well known Doppler effect. The value of the amplitude of the resultant pulse in the antenna circuit will therefore vary instantaneously depending on the instantaneous phase relationship between the transmitted and the reflected signals, and these variations are shown in FIG. 4 by the variations in amplitude of successive trains of pulses 51. The envelope curve of these amplitudes is represented at 54 and this envelope is the Doppler signal which is detected by tube 8 and amplified by tube 9. The constants of the low-pass filter associated with tube 9 are selected to pass only frequencies in the desired range which will result from the relative velocities of the projectile and target. This range varies within certain limits—in the case of a bomb the velocity tends to increase constantly and in the case of a shell or rocket the velocity tends to decrease during the flight of the projectile and the range must be selected accordingly. In most practical cases the Doppler frequency will be in the order of a few hundred cycles.

FIG. 5 shows essentially the same circuit as FIG. 2, but employing a different method of pulsing. Instead of utilizing the cusps of an unfiltered full wave rectified output from the generator, the new pulse source is independent of generator speed. It consists of a local pulse discharge circuit utilizing a thyraton-modulator 60, which discharges periodically at a high frequency determined by the values of resistance 61 and condenser 62 in its plate circuit. A pulse transformer, 63 preferably using a Hypersil core in its magnetic circuit to permit efficient passage of sharply peaked pulses has a turns ration of 10 to 1. Secondary shunting is provided by resistor 64 to reduce ringing effects due to resonance. A grid bias resistor for tube 7 is provided at 66. The periodic discharges of the thyratron thus produce positive potential pulses at the grid of oscillator tube 7, through taps C of tank circuit L1, as before, to oppose the negative bias on the tube and to permit highfrequency oscillation bursts as before, during the pulse durations.

The above circuit uses one less tube than the circuit of FIG. 2 and puts less filament drain on the generator, thus contributing to compactness. By using this circuit, the duty factor or pulse duration can be cut from 10 percent to about 2 percent. This renders the fuse less susceptible to jamming or interference from external signals, and also permits higher peak power output to be realized by increasing the plate supply voltage by at least 50 percent. It has not been found that decreased pulse-duration time appreciably affects or alters the oscillator sensitivity, so that no disadvantages appear to result from the use of the improved pulse circuit.

While the principles of my invention have been shown and described in connection with a specific circuit embodiment, it is apparent that various modifications may be made without departing from the invention, and it is intended to cover in the appended claims all such changes and modifications as fall within the scope of the invention.

I claim:

1. A system for detecting the presence of an electrically reflecting body comprising means for transmitting trains of high frequency waves, each train being relatively short in duration in comparison with the period between trains, said transmitting means including means for receiving reflections of said waves from a body having motion relative to said transmitting means, means for combining the transmitted and reflected waves, and means for detecting a beat frequency in the resultant of the transmitted and reflected waves, said means for transmitted high frequency waves comprising an electron tube oscillator circuit and an antenna associated therewith, means for applying periodic sharply peaked bias voltage at a much lower frequency than said high frequency to said tube of a value to cause said electron tube oscillator to oscillate only during the peaks of said bias voltage, said means for applying sharply peaked bias voltage includes a source of alternating current and a full wave rectifier coupled thereto for rectifying said alternating current whereby voltage pulses are applied to a grid of saids tube to bias said tube against oscillation except near zero voltage value of said voltage pulses, said means for detecting a beat frequency includes a diode having a cathode and a plate, a connection from said transmitting means for coupling pulses to said cathode, means for bypassing high frequency from the plate of said diode to the ground, and means for amplifying only the detected resultant frequency.

2. An ordnance fuse comprising a pulsed radio frequency oscillator, pulsing means for said oscillator, said oscillator including an electron tube having grid, plate and cathode elements, a diode for detecting reflections of radio frequency energy generated by said oscillator and radiated by radiation means coupled thereto, said radiation means common to the oscillator and diode, a frequency selective amplifier coupled to said diode and responsive to the Doppler frequency due to the relative movement of said fuse and a reflective surface, detonator triggering means coupled to the output of said amplifier, and wind driven alternating current generating means for supplying power to the fuse, said pulsing means comprising a transformer coupled to the high voltage output of said generating means, rectifying means connected across the output terminals of said transformer, said grid connected to the transformer at a point intermediate its output terminals whereby a variable bias is applied to said grid and said oscillator periodically pulsed in accordance with the frequency of said generating means.

* * * * *